(12) United States Patent
Kingscott (10) Patent No.: US 11,781,971 B2
(45) Date of Patent: *Oct. 10, 2023

(54) OPTICAL VIBRATION DETECTION SYSTEM AND METHOD

(71) Applicant: BRAGI GmbH, Munich (DE)

(72) Inventor: Lisa Kingscott, Munich (DE)

(73) Assignee: BRAGI GMBH, Munich (DE)

( * ) Notice: Subject to any disclaimer, the term of this patent is extended or adjusted under 35 U.S.C. 154(b) by 139 days.

This patent is subject to a terminal disclaimer.

(21) Appl. No.: 17/387,309

(22) Filed: Jul. 28, 2021

(65) Prior Publication Data

US 2021/0356388 A1 Nov. 18, 2021

Related U.S. Application Data

(63) Continuation of application No. 15/637,826, filed on Jun. 29, 2017, now Pat. No. 11,085,871.
(Continued)

(51) Int. Cl.
*G01N 21/17* (2006.01)
*G01H 9/00* (2006.01)
(Continued)

(52) U.S. Cl.
CPC ......... *G01N 21/1702* (2013.01); *G01H 9/002* (2013.01); *H04R 1/1016* (2013.01);
(Continued)

(58) Field of Classification Search
None
See application file for complete search history.

(56) References Cited

U.S. PATENT DOCUMENTS

| 2,325,590 A | 8/1943 | Carlisle et al. |
| 2,430,229 A | 11/1947 | Kelsey |

(Continued)

FOREIGN PATENT DOCUMENTS

| CN | 204244472 U | 4/2015 |
| CN | 104683519 A | 6/2015 |

(Continued)

OTHER PUBLICATIONS

Akkermans, "Acoustic Ear Recognition for Person Identification", Automatic Identification Advanced Technologies, 2005 pp. 219-223.

(Continued)

*Primary Examiner* — Luke D Ratcliffe
(74) *Attorney, Agent, or Firm* — Goodhue, Coleman & Owens, P.C.

(57) ABSTRACT

A system includes at least one earpiece wherein each earpiece comprises an earpiece housing, a light source operatively connected to each earpiece housing and configured to transmit substantially coherent light toward an outer surface of a user's body, a light receiver operatively connected to the earpiece housing proximate to the light source and configured to receive reflected light from the outer surface of the user's body, and one or more processors disposed within the earpiece housing and operatively connected to the light source and light receiver, wherein one or more processors is configured to determine bone vibration measurements from the reflected light. A method of determining bone vibrations includes providing at least one earpiece, transmitting substantially coherent light toward an outer surface of a user's body using the earpiece, receiving reflected light from the outer surface of the user's body using the earpiece, and determining bone vibration measurements using the earpiece.

17 Claims, 6 Drawing Sheets

Related U.S. Application Data (60) Provisional application No. 62/359,023, filed on Jul. 6, 2016.

(51) Int. Cl.
  *H04R 23/00* (2006.01)
  *H04R 1/10* (2006.01)
  *H04R 5/033* (2006.01)

(52) U.S. Cl.
  CPC ..... *H04R 23/008* (2013.01); *G10K 2210/129* (2013.01); *H04R 1/1041* (2013.01); *H04R 5/033* (2013.01); *H04R 2460/13* (2013.01)

(56) References Cited

U.S. PATENT DOCUMENTS

| | | | |
|---|---|---|---|
| 3,047,089 A | | 7/1962 | Zwislocki |
| D208,784 S | | 10/1967 | Sanzone |
| 3,586,794 A | | 6/1971 | Michaelis |
| 3,934,100 A | | 1/1976 | Harada |
| 3,983,336 A | | 9/1976 | Malek et al. |
| 4,069,400 A | | 1/1978 | Johanson et al. |
| 4,150,262 A | | 4/1979 | Ono |
| 4,334,315 A | | 6/1982 | Ono et al. |
| D266,271 S | | 9/1982 | Johanson et al. |
| 4,375,016 A | | 2/1983 | Harada |
| 4,516,428 A | * | 5/1985 | Konomi ............... H04R 19/04 |
| | | | 381/151 |
| 4,588,867 A | | 5/1986 | Konomi |
| 4,617,429 A | | 10/1986 | Bellafiore |
| 4,654,883 A | | 3/1987 | Iwata |
| 4,682,180 A | | 7/1987 | Gans |
| 4,791,673 A | | 12/1988 | Schreiber |
| 4,852,177 A | | 7/1989 | Ambrose |
| 4,865,044 A | | 9/1989 | Wallace et al. |
| 4,984,277 A | | 1/1991 | Bisgaard et al. |
| 5,008,943 A | | 4/1991 | Arndt et al. |
| 5,185,802 A | | 2/1993 | Stanton |
| 5,191,602 A | | 3/1993 | Regen et al. |
| 5,201,007 A | | 4/1993 | Ward et al. |
| 5,201,008 A | | 4/1993 | Arndt et al. |
| D340,286 S | | 10/1993 | Seo |
| 5,280,524 A | | 1/1994 | Norris |
| 5,295,193 A | | 3/1994 | Ono |
| 5,298,692 A | | 3/1994 | Ikeda et al. |
| 5,343,532 A | | 8/1994 | Shugart |
| 5,347,584 A | | 9/1994 | Narisawa |
| 5,363,444 A | | 11/1994 | Norris |
| D367,113 S | | 2/1996 | Weeks |
| 5,497,339 A | | 3/1996 | Bernard |
| 5,606,621 A | | 2/1997 | Reiter et al. |
| 5,613,222 A | | 3/1997 | Guenther |
| 5,654,530 A | | 8/1997 | Sauer et al. |
| 5,692,059 A | | 11/1997 | Kruger |
| 5,721,783 A | | 2/1998 | Anderson |
| 5,748,743 A | | 5/1998 | Weeks |
| 5,749,072 A | | 5/1998 | Mazurkiewicz et al. |
| 5,771,438 A | | 6/1998 | Palermo et al. |
| D397,796 S | | 9/1998 | Yabe et al. |
| 5,802,167 A | | 9/1998 | Hong |
| D410,008 S | | 5/1999 | Almqvist |
| 5,929,774 A | | 7/1999 | Charlton |
| 5,933,506 A | | 8/1999 | Aoki et al. |
| 5,949,896 A | | 9/1999 | Nageno et al. |
| 5,987,146 A | | 11/1999 | Pluvinage et al. |
| 6,021,207 A | | 2/2000 | Puthuff et al. |
| 6,054,989 A | | 4/2000 | Robertson et al. |
| 6,081,724 A | | 6/2000 | Wilson |
| 6,094,492 A | | 7/2000 | Boesen |
| 6,111,569 A | | 8/2000 | Brusky et al. |
| 6,112,103 A | | 8/2000 | Puthuff |
| 6,157,727 A | | 12/2000 | Rueda |
| 6,167,039 A | | 12/2000 | Karlsson et al. |
| 6,181,801 B1 | | 1/2001 | Puthuff et al. |
| 6,208,372 B1 | | 3/2001 | Barraclough |
| 6,230,029 B1 | | 5/2001 | Yegiazaryan et al. |
| 6,275,789 B1 | | 8/2001 | Moser et al. |
| 6,339,754 B1 | | 1/2002 | Flanagan et al. |
| D455,835 S | | 4/2002 | Anderson et al. |
| 6,408,081 B1 | | 6/2002 | Boesen |
| 6,424,820 B1 | | 7/2002 | Burdick et al. |
| D464,039 S | | 10/2002 | Boesen |
| 6,470,893 B1 | | 10/2002 | Boesen |
| D468,299 S | | 1/2003 | Boesen |
| D468,300 S | | 1/2003 | Boesen |
| 6,542,721 B2 | | 4/2003 | Boesen |
| 6,560,468 B1 | | 5/2003 | Boesen |
| 6,654,721 B2 | | 11/2003 | Handelman |
| 6,664,713 B2 | | 12/2003 | Boesen |
| 6,690,807 B1 | | 2/2004 | Meyer |
| 6,694,180 B1 | | 2/2004 | Boesen |
| 6,718,043 B1 | | 4/2004 | Boesen |
| 6,738,485 B1 | | 5/2004 | Boesen |
| 6,748,095 B1 | | 6/2004 | Goss |
| 6,754,358 B1 | | 6/2004 | Boesen et al. |
| 6,784,873 B1 | | 8/2004 | Boesen et al. |
| 6,823,195 B1 | | 11/2004 | Boesen |
| 6,852,084 B1 | | 2/2005 | Boesen |
| 6,879,698 B2 | | 4/2005 | Boesen |
| 6,892,082 B2 | | 5/2005 | Boesen |
| 6,920,229 B2 | | 7/2005 | Boesen |
| 6,952,483 B2 | | 10/2005 | Boesen et al. |
| 6,987,986 B2 | | 1/2006 | Boesen |
| 7,010,137 B1 | | 3/2006 | Leedom et al. |
| 7,113,611 B2 | | 9/2006 | Leedom et al. |
| D532,520 S | | 11/2006 | Kampmeier et al. |
| 7,136,282 B1 | | 11/2006 | Rebeske |
| 7,203,331 B2 | | 4/2007 | Boesen |
| 7,209,569 B2 | | 4/2007 | Boesen |
| 7,215,790 B2 | | 5/2007 | Boesen et al. |
| D549,222 S | | 8/2007 | Huang |
| D554,756 S | | 11/2007 | Sjursen et al. |
| 7,403,629 B1 | | 7/2008 | Aceti et al. |
| D579,006 S | | 10/2008 | Kim et al. |
| 7,463,902 B2 | | 12/2008 | Boesen |
| 7,508,411 B2 | | 3/2009 | Boesen |
| D601,134 S | | 9/2009 | Elabidi et al. |
| 7,825,626 B2 | | 11/2010 | Kozisek |
| 7,965,855 B1 | | 6/2011 | Ham |
| 7,979,035 B2 | | 7/2011 | Griffin et al. |
| 7,983,628 B2 | | 7/2011 | Boesen |
| D647,491 S | | 10/2011 | Chen et al. |
| 8,095,188 B2 | | 1/2012 | Shi |
| 8,108,143 B1 | | 1/2012 | Tester |
| 8,140,357 B1 | | 3/2012 | Boesen |
| D666,581 S | | 9/2012 | Perez |
| 8,300,864 B2 | | 10/2012 | Müllenborn et al. |
| 8,406,448 B2 | | 3/2013 | Lin et al. |
| 8,436,780 B2 | | 5/2013 | Schantz et al. |
| D687,021 S | | 7/2013 | Yuen |
| 8,719,877 B2 | | 5/2014 | VonDoenhoff et al. |
| 8,774,434 B2 | | 7/2014 | Zhao et al. |
| 8,831,266 B1 | | 9/2014 | Huang |
| 8,891,800 B1 | | 11/2014 | Shaffer |
| 8,994,498 B2 | | 3/2015 | Agrafioti et al. |
| D728,107 S | | 4/2015 | Martin et al. |
| 9,013,145 B2 | | 4/2015 | Castillo et al. |
| 9,037,125 B1 | | 5/2015 | Kadous |
| D733,103 S | | 6/2015 | Jeong et al. |
| 9,081,944 B2 | | 7/2015 | Camacho et al. |
| 9,510,159 B1 | | 11/2016 | Cuddihy et al. |
| D773,439 S | | 12/2016 | Walker |
| D775,158 S | | 12/2016 | Dong et al. |
| D777,710 S | | 1/2017 | Palmborg et al. |
| D788,079 S | | 5/2017 | Son et al. |
| 2001/0005197 A1 | | 6/2001 | Mishra et al. |
| 2001/0027121 A1 | | 10/2001 | Boesen |
| 2001/0043707 A1 | | 11/2001 | Leedom |
| 2001/0056350 A1 | | 12/2001 | Calderone et al. |
| 2002/0002413 A1 | | 1/2002 | Tokue |
| 2002/0007510 A1 | | 1/2002 | Mann |
| 2002/0010590 A1 | | 1/2002 | Lee |
| 2002/0030637 A1 | | 3/2002 | Mann |
| 2002/0046035 A1 | | 4/2002 | Kitahara et al. |

(56) References Cited

U.S. PATENT DOCUMENTS

| | | |
|---|---|---|
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1* | 6/2008 | LeBoeuf ............. A61B 7/003 600/300 |
| 2008/0254780 A1 | 10/2008 | Kuhl et al. |
| 2008/0255430 A1 | 10/2008 | Alexandersson et al. |
| 2009/0003620 A1 | 1/2009 | McKillop et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0191920 A1 | 7/2009 | Regen et al. |
| 2009/0245559 A1 | 10/2009 | Boltyenkov et al. |
| 2009/0296968 A1 | 12/2009 | Wu et al. |
| 2010/0033313 A1 | 2/2010 | Keady et al. |
| 2010/0061562 A1* | 3/2010 | Segev ............. H04R 23/008 356/450 |
| 2010/0203831 A1 | 8/2010 | Muth |
| 2010/0210212 A1 | 8/2010 | Sato |
| 2010/0320961 A1 | 12/2010 | Castillo et al. |
| 2011/0286615 A1 | 11/2011 | Olodort et al. |
| 2012/0057740 A1 | 3/2012 | Rosal |
| 2012/0215519 A1* | 8/2012 | Park ............. H04R 3/005 381/17 |
| 2013/0316642 A1 | 11/2013 | Newham |
| 2013/0346168 A1 | 12/2013 | Zhou et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0163771 A1 | 6/2014 | Demeniuk |
| 2014/0185828 A1 | 7/2014 | Helbling |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0348367 A1 | 11/2014 | Vavrus et al. |
| 2015/0028996 A1 | 1/2015 | Agrafioti et al. |
| 2015/0110587 A1 | 4/2015 | Hori |
| 2015/0148989 A1 | 5/2015 | Cooper et al. |
| 2015/0245127 A1 | 8/2015 | Shaffer |
| 2016/0033280 A1 | 2/2016 | Moore et al. |
| 2016/0072558 A1 | 3/2016 | Hirsch et al. |
| 2016/0073189 A1 | 3/2016 | Linden et al. |
| 2016/0125892 A1 | 5/2016 | Bowen et al. |
| 2016/0360350 A1 | 12/2016 | Watson et al. |
| 2017/0078780 A1 | 3/2017 | Qian et al. |
| 2017/0111726 A1 | 4/2017 | Martin et al. |
| 2017/0155992 A1 | 6/2017 | Perianu et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 11/1981 |
| GB | 2508226 A | 5/2014 |
| JP | 06292195 | 10/1998 |
| WO | 2008103925 A1 | 8/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |

OTHER PUBLICATIONS

Announcing the $3,333,333 Stretch Goal (Feb. 24, 2014) pp. 1-14.

Ben Coxworth: "Graphene-based ink could enable low-cost, foldable electronics", "Journal of Physical Chemistry Letters", Northwestern University, (May 22, 2013), pp. 1-7.

Blain: "World's first graphene speaker already superior to Sennheiser MX400", htt://www.gizmag.com/graphene-speaker-beats-sennheiser-mx400/31660, (Apr. 15, 2014).

BMW, "BMW introduces BMW Connected—The personalized digital assistant", "http://bmwblog.com/2016/01/05/bmw-introduces-bmw-connected-the-personalized-digital-assistant", (Jan. 5, 2016).

BRAGI Is on Facebook (2014), pp. 1-51.

BRAGI Update—Arrival of Prototype Chassis Parts—More People—Awesomeness (May 13, 2014), pp. 1-8.

BRAGI Update—Chinese New Year, Design Verification, Charging Case, More People, Timeline(Mar. 6, 2015), pp. 1-18.

BRAGI Update—First Sleeves From Prototype Tool—Software Development Kit (Jun. 5, 2014), pp. 1-8.

BRAGI Update—Let's Get Ready to Rumble, A Lot to Be Done Over Christmas (Dec. 22, 2014), pp. 1-18.

BRAGI Update—Memories From April—Update on Progress (Sep. 16, 2014), pp. 1-15.

BRAGI Update—Memories from May—Update on Progress—Sweet (Oct. 13, 2014), pp. 1-16.

BRAGI Update—Memories From One Month Before Kickstarter—Update on Progress (Jul. 10, 2014), pp. 1-17.

BRAGI Update—Memories From the First Month of Kickstarter—Update on Progress (Aug. 1, 2014), pp. 1-16.

BRAGI Update—Memories From the Second Month of Kickstarter—Update on Progress (Aug. 22, 2014), pp. 1-15.

BRAGI Update—New People @BRAGI—Prototypes (Jun. 26, 2014), pp. 1-9.

BRAGI Update—Office Tour, Tour to China, Tour to CES (Dec. 11, 2014), pp. 1-14.

BRAGI Update—Status on Wireless, Bits and Pieces, Testing—Oh Yeah, Timeline(Apr. 24, 2015), pp. 1-18.

BRAGI Update—The App Preview, The Charger, The SDK, BRAGI Funding and Chinese New Year (Feb. 11, 2015), pp. 1-19.

BRAGI Update—What We Did Over Christmas, Las Vegas & CES (Jan. 19, 2014), pp. 1-21.

BRAGI Update—Years of Development, Moments of Utter Joy and Finishing What We Started(Jun. 5, 2015), pp. 1-21.

BRAGI Update—Alpha 5 and Back to China, Backer Day, On Track(May 16, 2015), pp. 1-15.

BRAGI Update—Beta2 Production and Factory Line(Aug. 20, 2015), pp. 1-16.

BRAGI Update—Certifications, Production, Ramping Up (Nov. 13, 2015), pp. 1-15.

BRAGI Update—Developer Units Shipping and Status(Oct. 5, 2015), pp. 1-20.

(56) References Cited

OTHER PUBLICATIONS

BRAGI Update—Developer Units Started Shipping and Status (Oct. 19, 2015), pp. 1-20.
BRAGI Update—Developer Units, Investment, Story and Status(Nov. 2, 2015), pp. 1-14.
BRAGI Update—Getting Close(Aug. 6, 2015), pp. 1-20.
BRAGI Update—On Track, Design Verification, How It Works and What's Next(Jul. 15, 2015), pp. 1-17.
BRAGI Update—On Track, On Track and Gems Overview (Jun. 24, 2015), pp. 1-19.
BRAGI Update—Status on Wireless, Supply, Timeline and Open House@BRAGI(Apr. 1, 2015), pp. 1-17.
BRAGI Update—Unpacking Video, Reviews on Audio Perform and Boy Are We Getting Close(Sep. 10, 2015), pp. 1-15.
Healthcare Risk Management Review, "Nuance updates computer-assisted physician documentation solution" (Oct. 20, 2016), pp. 1-2.
Hoyt et. al., "Lessons Learned from Implementation of Voice Recognition for Documentation in the Military Electronic Health Record System", The American Health Information Management Association (2017), pp. 1-8.
Hyundai Motor America, "Hyundai Motor Company Introduces a Health + Mobility Concept for Wellness in Mobility", Fountain Valley, Califorrna (2017), pp. 1-3.
Last Push Before the Kickstarter Campaign Ends on Monday 4pm CET (Mar. 28, 2014), pp. 1-7.
Nigel Whitfield: "Fake tape detectors, from the stands' footie and UGH? Internet of Things in my set-top box"; http://www.theregister.co.uk/2014/09/24/ibc_round_up_object_audio_dina_iot/ (Sep. 24, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014), pp. 1-14.
Stretchgoal—The Carrying Case for the Dash (Feb. 12, 2014), pp. 1-9.
Stretchgoal—Windows Phone Support (Feb. 17, 2014), pp. 1-17.
The Dash + The Charging Case & The BRAGI News (Feb. 21, 14), pp. 1-12.
The Dash—A Word From Our Software, Mechanical and Acoustics Team + An Update (Mar. 11, 2014), pp. 1-7.
Update From BRAGI—$3,000,000—Yipee (Mar. 22, 2014), pp. 1-11.

* cited by examiner

OPTICAL VIBRATION DETECTION SYSTEM AND METHOD

PRIORITY STATEMENT

This application is a continuation of U.S. Non-provisional patent application Ser. No. 15/637,826, filed on Jun. 29, 2017, which claims priority to U.S. Provisional Patent Application 62/359,023, filed on Jul. 6, 2016, and both entitled Optical Vibration Detection System and Method, hereby incorporated by reference in their entirety.

FIELD OF THE INVENTION

The present invention relates to wearable devices. More particularly, but not exclusively, the present invention relates to earpieces.

BACKGROUND

Detecting bone vibration can be an important function for wearable devices such as earpieces. Indeed, for some applications, detecting bone vibration can be a critical feature. Yet in some implementations, bone vibrations may affect the functioning of the wearable device such as causing signal distortion or possibly mechanical malfunctions thereby reducing the effectiveness of the earpiece. What is needed are new and innovative ways to measure bone vibrations in wearable devices such as wireless earpieces.

SUMMARY

Therefore, it is a primary object, feature, or advantage of the present invention to improve over the state of the art.

It is a further object, feature, or advantage of the present invention to detect and measure bone vibrations using an earpiece.

It is a still further object, feature, or advantage of the present invention to minimize the effects of mechanical disturbances on an earpiece related to bone vibrations.

Another object, feature, or advantage is to reduce the chances of a signal transmission or reception failure due to earpiece vibrations.

Yet another object, feature, or advantage is to minimize the need to attenuate signals.

In one implementation, a system includes at least one earpiece, wherein each earpiece includes an earpiece housing, a light source operatively connected to the earpiece housing and configured to transmit light toward an outer surface of a user's body, wherein the light source is substantially coherent, a light receiver operatively connected to the earpiece housing proximate to the light source configured to receive reflected light from the light transmitted to the outer surface of the user's body, and at least one processor disposed within the earpiece housing and operatively connected to the light source and the light receiver, wherein the at least one processor is configured to determine bone vibration measurements from the reflected light.

One or more of the following features may be included. One or more earpieces may comprise a set of earpieces. The light source may transmit the light intermittently toward the outer surface of the user's body. The light source may be transmitted toward multiple points on the outer surface of the user's body. The light receiver may be further configured to receive the reflected light from multiple points on an outer surface of the user's body. The light source and light receiver may comprise a laser Doppler vibrometer. The bone vibration measurements may comprise either the velocity or the displacement patterns of one or more bone vibrations.

In another implementation, a method of determining bone vibrations includes providing at least one earpiece, transmitting, via a light source, light toward an outer surface of a user's body, wherein the light is substantially coherent, receiving, via a light receiver, reflected light from the light transmitted to the outer surface of the user's body, and determining, via at least one processor, bone vibration measurements from the reflected light.

One or more of the following features may be included. One or more earpieces may comprise a set of earpieces. The light source may transmit the light intermittently toward the outer surface of the user's body. The light source may be transmitted toward multiple points on the outer surface of the user's body. The light receiver may be further configured to receive the reflected light from multiple points on an outer surface of the user's body. The light source and light receiver may comprise a laser Doppler vibrometer. The bone vibration measurements may comprise either the velocity or the displace pattern of one or more bone vibrations. One or more processors may modify a signal based on the bone vibration measurements. The signal may be an audio signal. One or more output devices may transmit a signal configured to neutralize the bone vibrations. One or more output device may also transmit the bone vibration measurements to an external electronic device.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an object, feature, or advantage stated herein.

DETAILED DESCRIPTION

Figure 1:
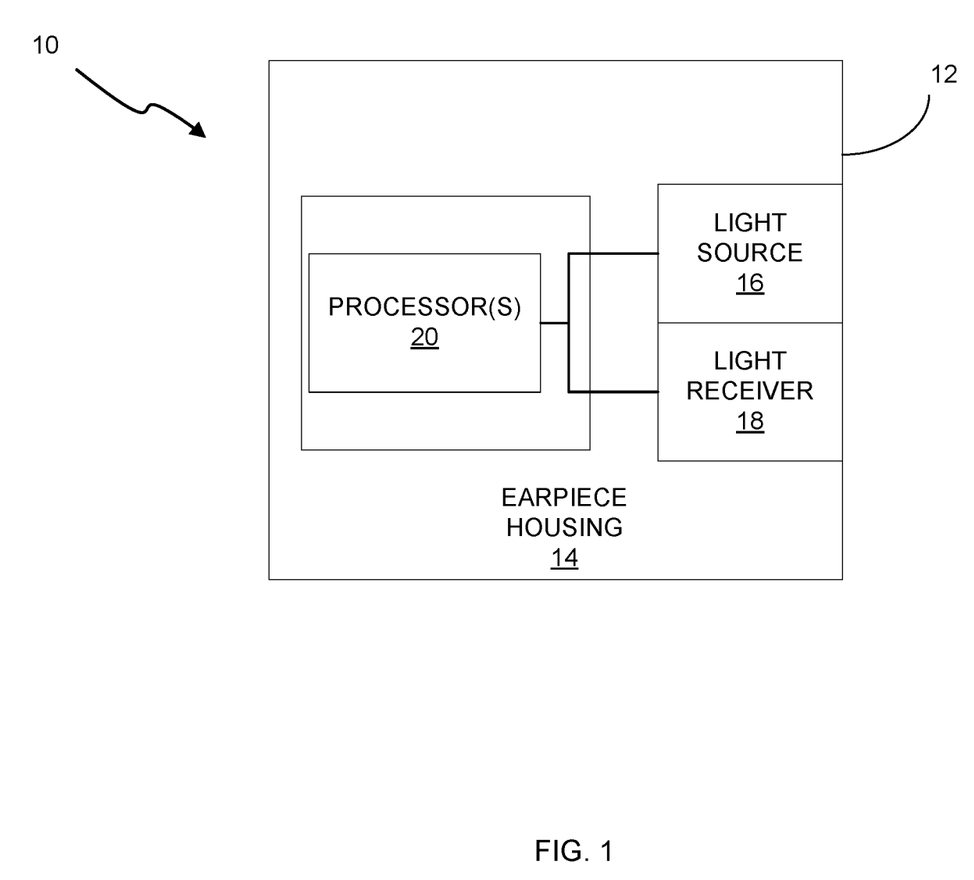
FIG. 1 is a block diagram regarding one embodiment of an earpiece.

FIG. 1 illustrates a block diagram of a system 10 comprising at least one earpiece 12 wherein each earpiece 12 comprises an earpiece housing 14, a light source 16 operatively connected to the earpiece housing, a light receiver 18 operatively connected to the earpiece housing 14, and one or more processors 20 operatively connected to the light source 16 and light receiver 18. One or more earpieces may comprise a set of earpieces with a left earpiece and a right earpiece. The light source 16 operatively connected to the earpiece housing 14 is configured to transmit light toward an outer surface of a user's body such as a surface within the external auditory canal. The light used may be of any frequency or amplitude and need not be discernable to a human eye, but preferably should be substantially coherent. Also, any electromagnetic wave that at least partially reflects off of the outer surface of the user's body may be substituted for light so long as the electromagnetic waves used are substantially coherent. In addition, a laser may be used as the light source as well. A light receiver 18 operatively connected to the earpiece housing 14 proximate to the light source 16 is configured to receive reflected light from the outer surface of the user's body. The reflected light received by the light receiver 18 may be received continuously or discretely, and the light receiver 18 may also receive other electromagnetic waves if necessary. For example, the light receiver 18 may receive both light from the light source 16, wherein the light from the light source is used as a reference, and reflected light from the outer surface of the user's body to be combined with the light 22 via interference. An intelligent control system which may include one or more processors 20 then determines whether any bone vibrations are present using the reflected light data from the light receiver 18 and if so determines data related to the bone vibrations. One or more processors 20 may receive the reflected light data from the light receiver continuously or discretely, and need not consider every piece of data. One or more processors 20 may use the bone vibration determinations to correct other signals that the earpiece 12 may be receiving or even to correct discrepancies related to the transmission of sound to a user's tympanic membranes the earpiece may be providing.

Figure 2:
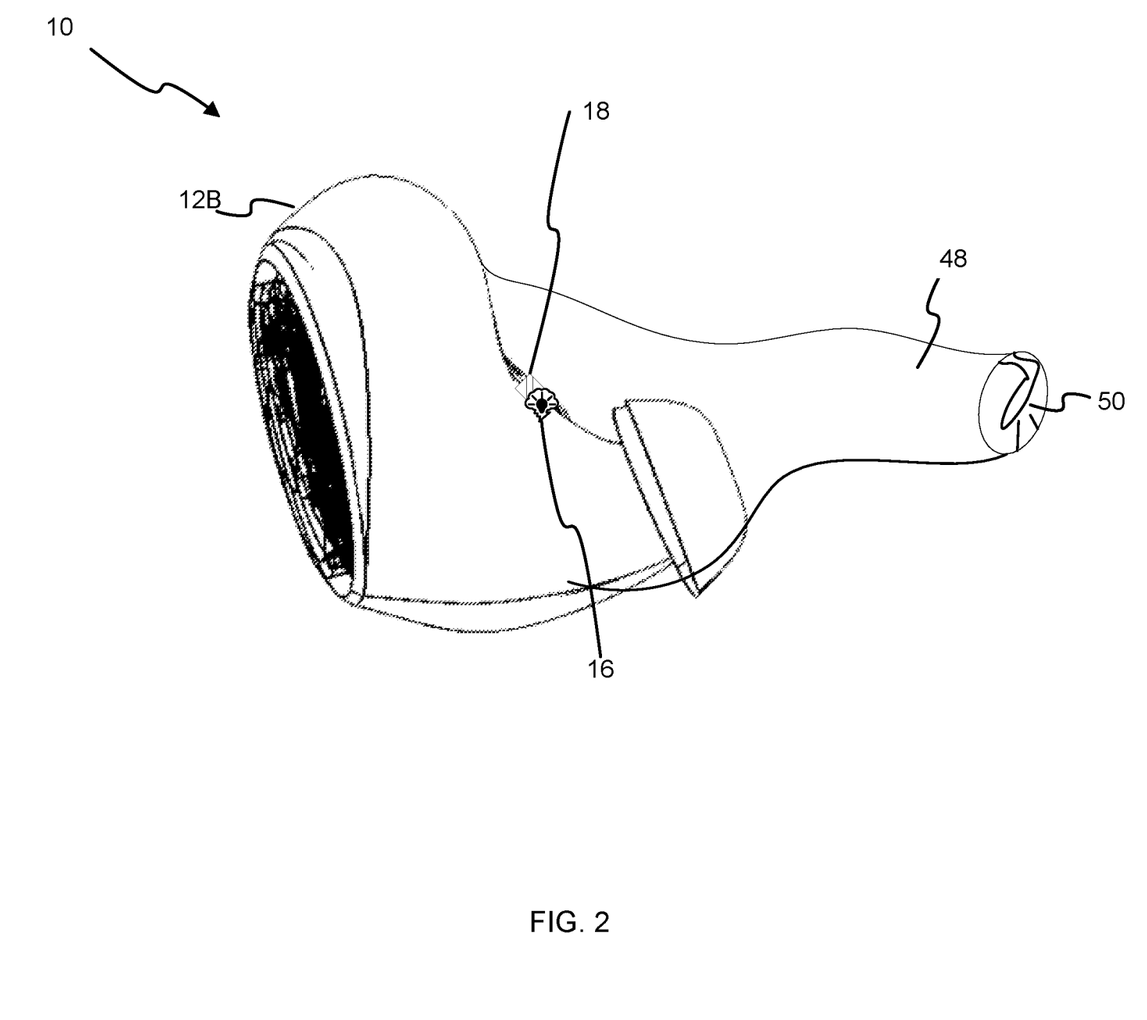
FIG. 2 illustrates a side view of a right earpiece.

FIG. 2 shows a right earpiece 12B inserted into a user's ear having a light source 16 and a light receiver 18. The right earpiece 12B may be configured to fit comfortably within a user's ear canal 48 so as to both minimize the amount of external sound reaching the user's ear canal 48 and to facilitate the transmission of sounds to a user's tympanic membrane 50. Ideally, the outer surface of the user's body 26 will be the inside of a user's external auditory canal 48, but the light 22 may be directed at any open surface on the user's body. Positioning the light source 16 and the light receiver 18 inside the user's external auditory canal 48 has three distinct advantages. One, the inside of the user's ear canal 48 contains little if no external light, allowing easier and more accurate measurements by the light receiver 18. Two, the inside of the user's ear canal 48 allows easy access to areas close to a user's skull to measure bone vibrations. Three, the distances between the light source 16 and the outer surface of a user's body 26 in the user's ear canal 48 are approximately the same for each prospective user, allowing for substantially accurate bone vibration calculations.

Figure 3:
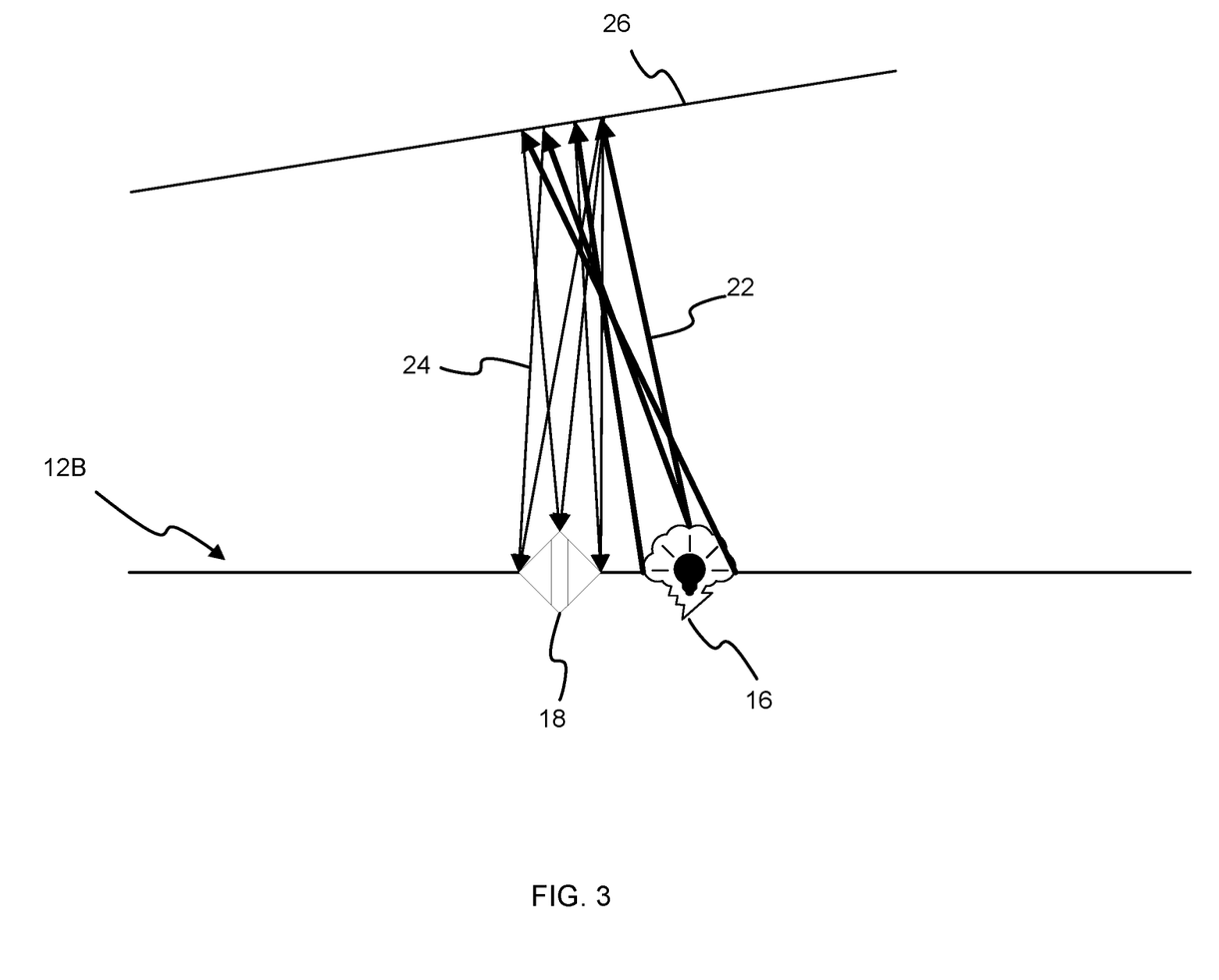
FIG. 3 illustrates the light source and the light receiver.

FIG. 3 illustrates the light source 16 and light receiver 18 and surfaces of an ear. A light source 16 transmits light 22 toward an outer surface of the user's body 26. The light 22 transmitted by the light source 16 should be substantially coherent. Also, the light source 16 should preferably not be directed toward a point where the vibrations move perpendicularly to the light source 16, or vibration calculations may not be obtainable. A light receiver 18 receives reflected light 24 from the outer surface of the user's body 26, which is combined with light 22 from the light source 16 to create interference. The interference information is transmitted to one or more processors 20 inside the earpiece 12B, which determines bone vibration data from the interference readings. The bone vibration data may include velocity, displacement, or anything else that may be beneficial to the ideal functioning of the earpiece 12B.

Figure 4:
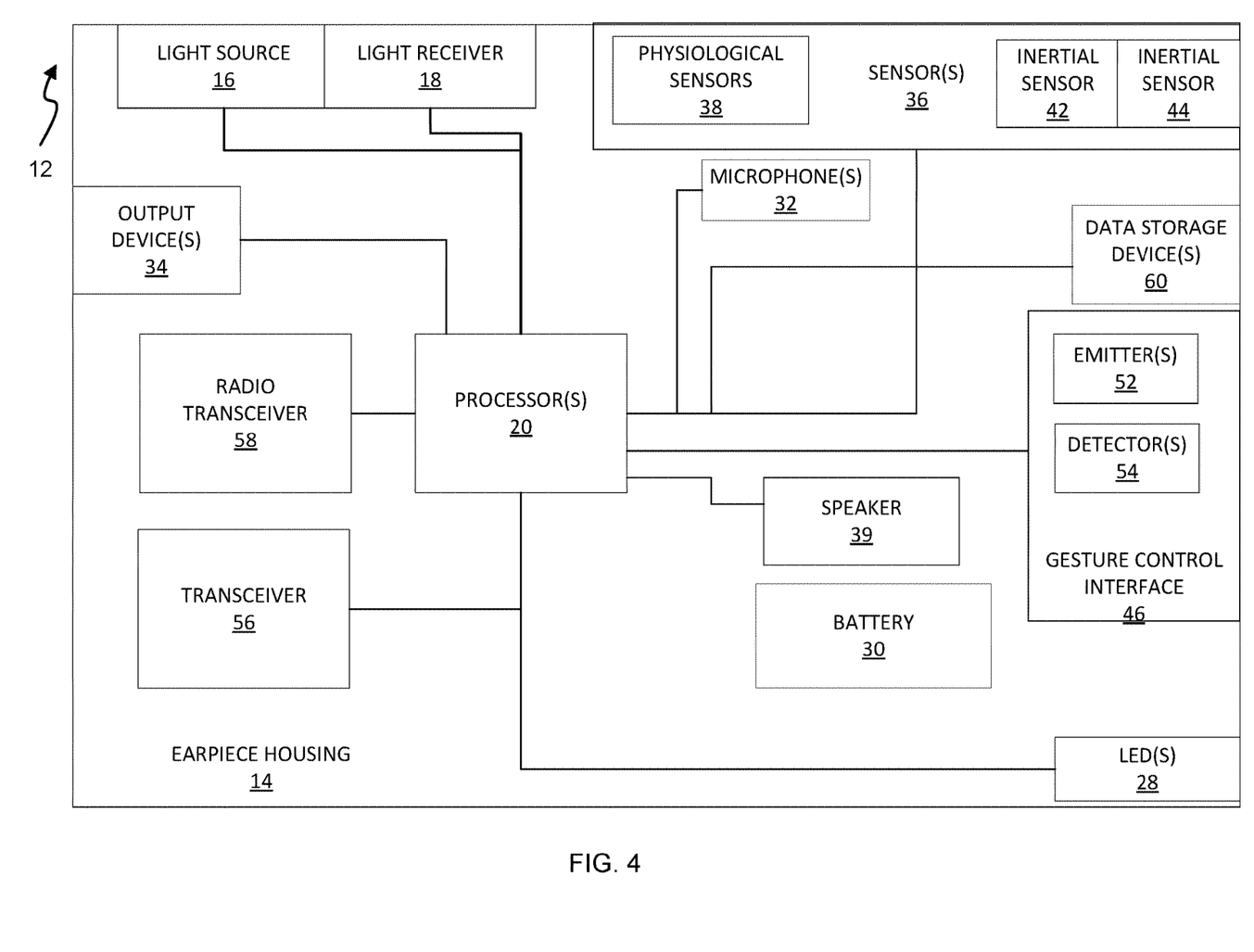
FIG. 4 is a block diagram of one example of the earpiece.

FIG. 4 is a block diagram of an earpiece 12 having an earpiece housing 14, a light source 16 operatively connected to the earpiece housing 14, a light receiver 18 proximate to the light source 16 and disposed within or otherwise operatively connected to the earpiece housing 14, at least one LED 28 operatively connected to the earpiece housing 14, one or more microphones 32 operatively connected to the earpiece housing 14, one or more output devices 34 operatively connected to the earpiece housing 14, at least one sensor 36 operatively connected to the earpiece housing 14. The at least one sensor may include one or more physiological sensors 38 such as heart rate sensors, pulse oximeters, temperature sensors, or other types of physiological sensors. The at least one sensor may also include one or more inertial sensors 42, 44. A gesture control interface 46 with at least one emitter 52 and at least one detector 54 is operatively connected to the earpiece housing 14. The gesture control interface may use optical transmitters or receivers, capacitive field sensing or other methodologies. A transceiver 56 is disposed within the earpiece 12, a radio transceiver 58 is disposed within the earpiece 12, and a battery 30 disposed within the earpiece 12. A processor 20 is disposed within the earpiece 12 and operatively connected to various of the aforementioned components. The earpiece 12 may be composed of metal, plastic, a combination of the two, or any other material suitable for human use and may be configured to be waterproof.

A light source 16 may be operatively connected to the earpiece housing 14 and may be configured to transmit light of any frequency or wavelength as long as the light is substantially coherent. For this reason, the light source 16 is ideally a laser, though any light source 16 capable of creating substantially coherent light may be used. Also, an acousto-optic modulator (a.k.a. a Bragg cell) may be incorporated into the light source 16 to determine the direction of any bone vibrations. The light source may transmit the light continuously or in pulses and may transmit the light at different locations on the outer surface of the user's body.

A light receiver 18 is proximate to the light source 16 and operatively connected to the earpiece housing 14. The light receiver 18 may receive, in addition to reflected light from the outer surface of the user's body, light from the light source to use as a reference in determining the frequency of the reflected light used to determine bone vibration information. The proximity of the light receiver 18 to the light source 16 need not be a certain length, though ideally the light receiver is very close to the light source 16 due to the proximity of the outer surface of the user's body to the light source 16. Also, a laser Doppler vibrometer may be used in place of the light source 16 and the light receiver 18 to ascertain bone vibrations. In a laser Doppler vibration setup, a laser is used as the light source, which is split into a reference beam and a measurement beam by a beamsplitter, wherein the reference beam is beamed through an acousto-optic modulator in order to create a frequency shift in which to ascertain a direction of the bone vibrations. The measurement beam is then beamed at the target location, which is directly reflected back in the direction of the measurement beam and then split by a beamsplitter toward a detector, where it merges with the reference beam to create interference. The detector determines the velocity from the frequency shift and interference patterns of the combined measurement and reference beam, which may be used to determine the displacement lengths of any bone vibrations that may be present.

The LEDs 28 operatively connected to the earpiece housing 14 may be configured to emit light in order to convey information to a user concerning the earpiece 12. The LEDs 28 may be located in any area on the earpiece 12 suitable for viewing by the user or a third party and may consist of as few as one diode which may be provided in combination with a light guide. In addition, the LEDs 28 may be discernable by a human eye or an electronic device and need not have a minimum luminescence.

One or more microphones 32 may be operatively connected to the earpiece housing 14 and may be configured to receive sounds from one or more sources, including the user, a third party, a machine, an animal, another earpiece, another electronic device, or even nature itself. The sounds received by one or more microphones 32 may include a word, combination of words, a sound, combinations of sounds, or any combination of the aforementioned. The sounds may be of any frequency and need not be audible to the user and may be used to reconfigure one or more components of the earpiece 12. For example, the user or third party may modify a default value used to calculate a bone vibration via a voice command, such as the distance between the light source and the outer surface of the user's body, or one or more microphones may pick up on sounds emanating from the user which may be used to correct measurement errors by the light receiver 18.

One or more output devices 34 operatively connected to the earpiece housing 14 may be configured to transmit sounds received from one or more microphones 32, the transceiver 56, or the radio transceiver 58 or even a data storage device 60. One or more output devices 34 may transmit information related to the operations of the earpiece 12 or information queried by the user or a third party to outside sources. For example, an output device 34 may transmit a signal related to bone vibration data to an external electronic device. The bone vibration data may be used by a medical professional for diagnostic purposes, a user for technical or personal purposes, or a third party for scientific, technical, or other purposes. In addition, an output device 34 may transmit an audio signal configured to neutralize any bone vibrations the earpiece 12 encounters.

One or more microphones 32 may be operatively connected to the earpiece housing 14 and may be configured to obtain additional bone vibration data that the light source 16 or the light receiver 18 may not be configured for. For example, the microphones may include an air microphone and a bone microphone which may be used to detect bone vibrations via pressure disturbances in the user's ear canal. The one or more inertial sensors 42 and 44 may be used to determine motion data related to the user's head and neck regions to be used to modify one or more readings of the light detector 18 or even to ascertain one or more variables of the bone vibration determination.

The gesture control interface 46 operatively connected to the earpiece housing 14 is configured to allow a user additional control over the earpiece 12. The gesture control interface 46 includes at least one emitter 52 and at least one detector 54 to detect gestures from either the user, a third party, an instrument, or a combination of the aforementioned and transmit one or more signals related to one or more gestures to one or more processors 20. The gestures that may be used with the gesture control interface 46 to control the earpiece 12 include, without limitation, touching, tapping, swiping, use of an instrument, or any combination of the aforementioned gestures. Touching gestures used to control the earpiece 12 may be of any duration and may include the touching of areas that are not part of the gesture control interface 46. Tapping gestures used to control the earpiece 12 may include any number of taps and need not be brief. Swiping gestures used to control the earpiece 12 may include a single swipe, a swipe that changes direction at least once, a swipe with a time delay, a plurality of swipes, or any combination of the aforementioned. An instrument used to control the earpiece 12 may be electronic, biochemical or mechanical, and may interface with the gesture control interface 46 either physically or electromagnetically.

One or more processors 20 is operatively connected to each component within the earpiece 12 and may be configured, in addition to transmitting and receiving signals from either the light source 16 or the light receiver 18, signals from one or more microphones 32, one or more sensors 36, the transceiver 56, or the radio transceiver 58. One or more processors may also be configured to use any information received from one or more microphones 32, one or more sensors 36, the transceiver 56, or the radio transceiver 58 in addition to information from the light receiver 18 to assist in the determination of any bone vibration data that may be relevant. One or more processors 20 may be reconfigured by the user or a third party through the use of one or more microphones 32, the gestural control interface 46, or by an electronic signal received from the transceiver 56 or the radio transceiver 58. Reconfigurations may include what bone vibration measurements to determine, the distance between the light source 16 and the outer surface of the user's body to use, or how often to measure a user's bone vibrations.

The transceiver 56 disposed within the earpiece 12 may be configured to receive signals from and to transmit signals to a second earpiece of the user if the user is using more than one earpiece. The transceiver 56 may receive or transmit more than one signal simultaneously. The transceiver 56 may be of any number of types including a near field magnetic induction (NFMI) transceiver.

The radio transceiver 58 disposed within the earpiece 12 may be configured to receive signals from external electronic devices and to transmit those signals to one or more processors 20. The external electronic devices the radio transceiver 58 may be configured to receive signals from include Bluetooth devices, mobile devices, desktops, laptops, tablets, modems, routers, communications towers, cameras, watches, third-party earpieces, earpieces, or other electronic devices capable of transmitting or receiving wireless signals. The radio transceiver 58 may receive or transmit more than one signal simultaneously.

One or more speakers 39 may also be present and may be operatively connected to the one or more processors 20 for transducing audio.

The battery 30 should provide enough power to operate an earpiece 12 for a reasonable duration of time. The battery 30 may be of any type suitable for powering an earpiece 12. However, the battery 30 need not be present in an earpiece 12. Alternative battery-less power sources, such as thermal harvesters that produce energy from differences between the user's or a third party's skin or internal body temperature and the ambient air, solar apparatuses which generate energy from the photovoltaic effect, or sensors configured to receive energy from radio waves (all of which are operatively connected to one or more earpieces 12) may be used to power the earpiece 12 in lieu of a battery 30.

Figure 5:
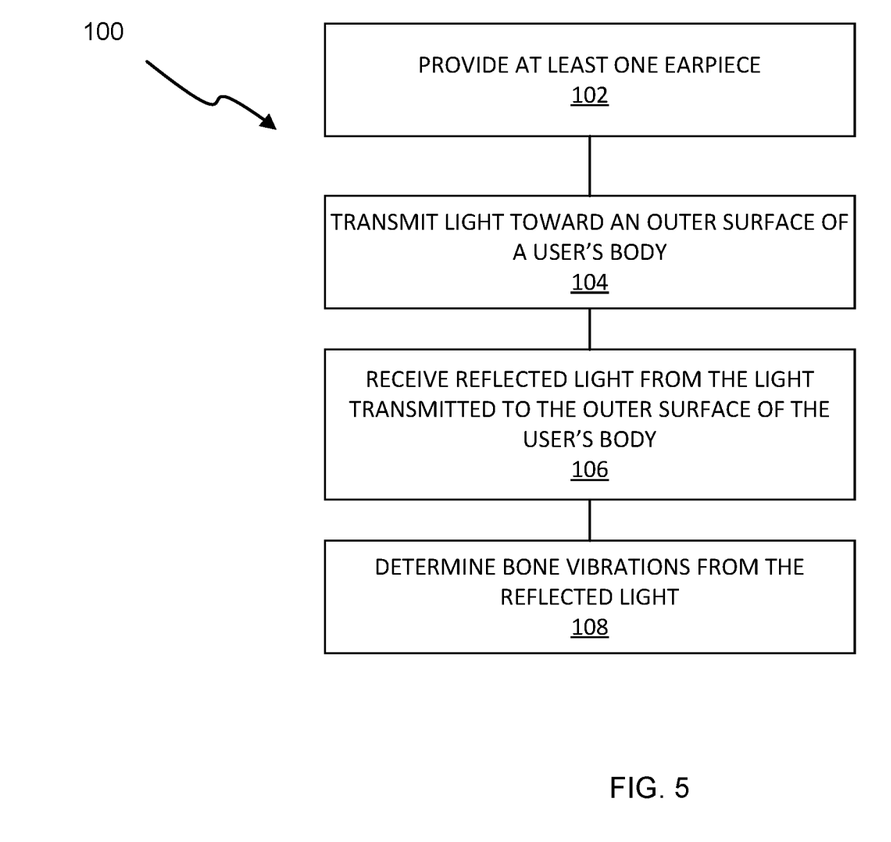
FIG. 5 is a flowchart of an implementation of a method of determining bone vibrations.

FIG. 5 illustrates one implementation of a method for determining bone vibrations with an earpiece 100. In step 102, at least one earpiece is provided. The earpiece may be provided to the user or a third party. In step 104, the light source transmits light toward an outer surface of the user's body. The transmission may be performed continuously or discretely, and the transmission need not target the same spot on the outer surface of the user's body. Also, any electromagnetic wave that is both substantially coherent and at least partially reflects off of the outer surface of the user's body may be substituted for light. A laser may be substituted for the light source as well. In step 106, a light receiver receives reflected light from the outer surface of the user's body. The reception may be continuous or discrete, and the light receiver may also be configured to receive reflected light from different points on the outer surface. In step 108, one or more processors use the reflected light data to determine whether any bone vibrations are present and if so determine any relevant data associated with the bone vibrations. For example, the bone vibrations may be indicative of speech by a user and thus relevant data may include an audio signal of the user. One or more processors may receive the reflected light data from the light receiver continuously or discretely, and need not consider every piece of data. One or more processors may use the bone vibration determinations to correct for any other signals that the earpiece may be receiving or even to correct for any transmission of sound to a user's tympanic membranes the earpiece may be providing. Thus, audio signals associated with bone vibrations may be received and interpreted. It is to be understood that a number of different techniques may be applied to identify and separate the different bone vibrations may be used. For example, filtering for may be used to identify or isolate bone vibrations associated with audio.

Figure 6:
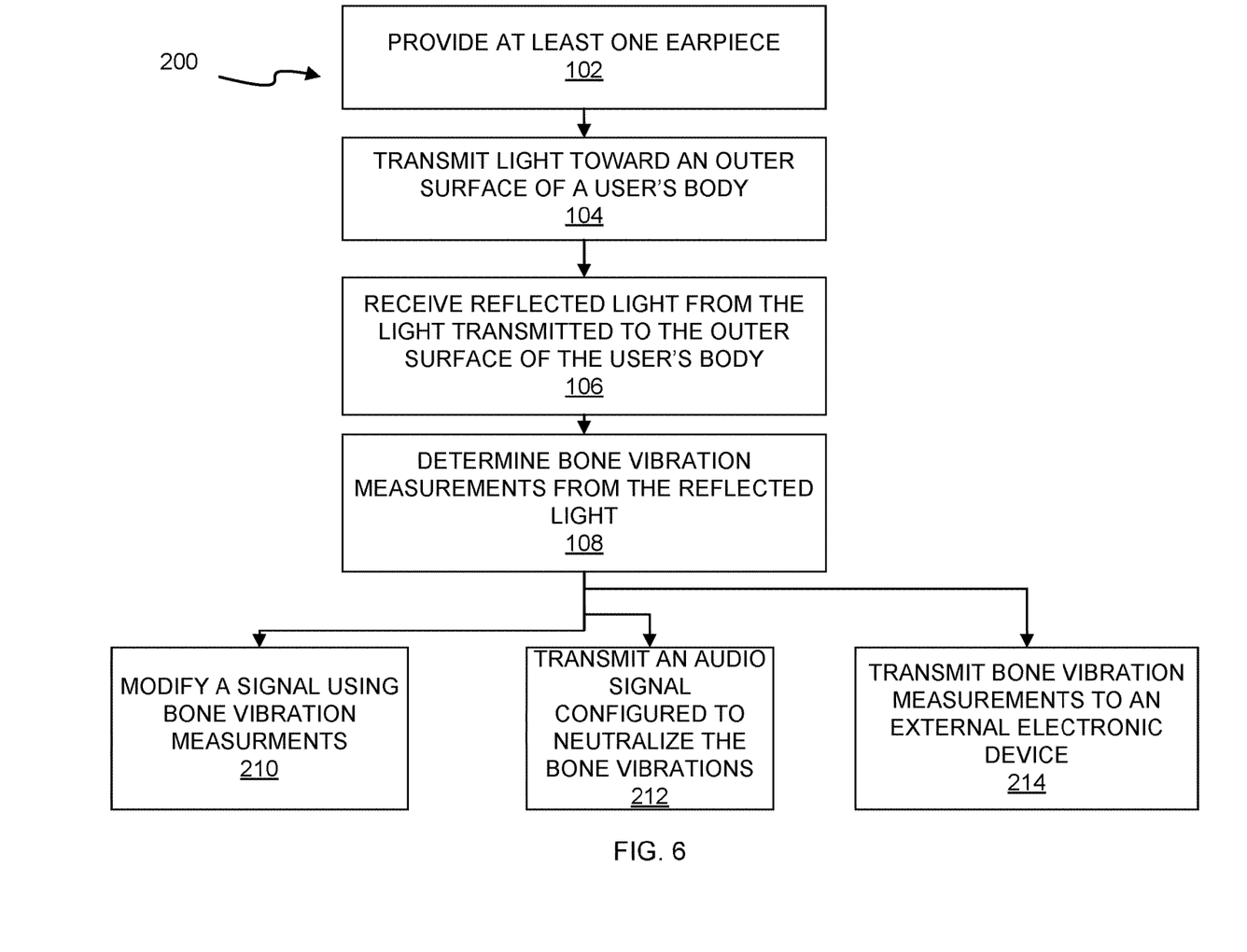
FIG. 6 is another flow chart of an implementation of a method of determining bone vibrations.

FIG. 6 illustrates another implementation of the method for determining bone vibrations with an earpiece 200. The first four steps of the method are largely identical to the method shown in FIG. 5, but some additional steps are added. In step 210, one or more processors modifies a signal either transmitted or received by the earpiece. The signal may be an audio signal from the user, an electromagnetic signal (for example an AM or FM radio wave), or even a gesture received by the gesture control interface. In step 212, regardless of whether step 210 has been carried out, an output device may transmit an audio signal configured to neutralize any bone vibrations present within the user. The transmission of the audio signal is ideally continuous, but may be discrete or intermittent as well. In step 214, regardless of whether steps 210 or 212 have been carried out, the output device transmits the bone vibration measurements to an external electronic device. The transmission of the bone vibration measurements may be used for purposes of medical diagnosis, medical treatment, or analysis, wherein the analysis may be scientifically or technically related to the user or the earpiece.

Therefore, various apparatus, methods, and systems have been shown and described. Although specific embodiments are shown, the present invention contemplates numerous variations, additions, options, and alternatives including different types of light sources, different types of light receivers, and other variations.

What is claimed is:

1. A method of determining bone vibrations comprising:
providing an earpiece having at least one processor and an output speaker;
receiving an audio signal at the earpiece;
transmitting, via a light source of the earpiece, light toward an outer surface of a user's body, wherein the light is substantially coherent;
receiving, via a light receiver of the earpiece, reflected light from the light transmitted to the outer surface of the user's body;
determining, via the at least one processor of the earpiece, bone vibration measurements from the reflected light; and
correcting the audio signal based on the bone vibration measurements to reduce effects associated with the bone vibrations on the audio;
after correcting the audio signal, outputting the audio signal from the output speaker.

2. The method of claim 1 wherein the light source transmits the light intermittently toward the outer surface of the user's body.

3. The method of claim 2 wherein the light source transmits the light toward multiple points on the outer surface of the user's body.

4. The method of claim 3 wherein the light receiver is further configured to receive the reflected light from multiple points on the outer surface of the user's body.

5. The method of claim 1 wherein the light source and the light receiver comprise a laser Doppler vibrometer.

6. The method of claim 1 wherein the bone vibration measurements comprise the velocity of at least one bone vibration.

7. The method of claim 6 wherein the bone vibration measurements comprise the displacement pattern of the at least one bone vibration.

8. The method of claim 1 wherein the correcting the audio provides for neutralizing effects of the bone vibrations.

9. The method of claim 1 further comprising transmitting the bone vibration measurements to an external electronic device.

10. A system comprising:
at least one earpiece, wherein each earpiece comprises an earpiece housing;
a light source operatively connected to the earpiece housing and configured to transmit light toward an outer surface of a user's body;
a light receiver operatively connected to the earpiece housing proximate to the light source configured to receive reflected light from the light transmitted to the outer surface of the user's body; and
at least one processor disposed within the earpiece housing and operatively connected to the light source and the light receiver, wherein the at least one processor is configured to determine bone vibration measurements from the reflected light and to modify an audio signal to neutralize the bone vibration measurements;
a transceiver disposed within the earpiece housing and operatively connected to the at least one earpiece;
an output speaker operatively connected to the at least one processor for outputting the audio signal.

11. The system of claim 10 wherein the at least one earpiece comprises a set of earpieces.

12. The system of claim 10 wherein the light source transmits the light intermittently toward the outer surface of the user's body.

13. The system of claim 12 wherein the light source transmits the light toward multiple points on the outer surface of the user's body.

14. The system of claim 13 wherein the light receiver is further configured to receive the reflected light from multiple points on the outer surface of the user's body.

15. The system of claim 10 wherein the light source and the light receiver comprise a laser Doppler vibrometer.

16. The system of claim 10 wherein the bone vibration measurements comprise the velocity of at least one bone vibration.

17. The system of claim 16 wherein the bone vibration measurements further comprise the displacement pattern of the at least bone vibration.

\* \* \* \* \*